United States Patent [19]
Busenkell

[11] 3,863,493
[45] Feb. 4, 1975

[54] COMPENSATED FLUIDIC BEARING CLEARANCE MONITOR

[75] Inventor: Charles C. Busenkell, Camarillo, Calif.

[73] Assignee: The United States of America as represented by the Secretary of the Navy, Washington, D.C.

[22] Filed: Nov. 23, 1973

[21] Appl. No.: 418,790

[52] U.S. Cl. .................................. 73/37.5, 116/65
[51] Int. Cl. .......................................... G01b 13/12
[58] Field of Search ..................... 73/37, 37.5–37.9, 73/388 BN, DIG. 8; 116/65; 235/201 FS; 33/DIG. 2

[56] References Cited
UNITED STATES PATENTS

| | | | |
|---|---|---|---|
| 3,220,244 | 11/1965 | Donnelly | 73/37.6 X |
| 3,363,453 | 1/1968 | Erickson | 73/37.6 X |
| 3,482,433 | 12/1969 | Gladwyn | 73/37.5 |
| 3,543,779 | 12/1970 | Eckerlin et al. | 235/201 X |
| 3,577,766 | 5/1971 | Walker | 73/37.9 |
| 3,665,767 | 5/1972 | Welk, Jr. | 73/DIG. 8 |

Primary Examiner—Charles A. Ruehl
Attorney, Agent, or Firm—Richard S. Sciascia; Joseph M. St.Amand; David O'Reilly

[57] ABSTRACT

A fluidic indicating system for monitoring clearances in hydrostatic bearings which has two identical fluidic nozzles connected to a pressurized fluid supply through identical lines. Errors due to environmental changes are eliminated by the use of identical nozzles and mounting them in a close proximity to each other. A fluidic logic system connected to the nozzles processes any differential pressure and provides a warning when bearing clearance goes above or below predetermined limits. The system also indicates a normal condition when bearing clearances are between predetermined limits.

4 Claims, 2 Drawing Figures

PATENTED FEB 4 1975 3,863,493

COMPENSATED FLUIDIC BEARING CLEARANCE MONITOR

BACKGROUND OF THE INVENTION

The present invention relates generally to systems and methods of measuring or monitoring clearances and more particularly relates to devices which provide an automatic warning when predetermined tolerances are exceeded.

Most present devices for measuring tolerances are based on optical, mechanical or electro-mechanical techniques. Optical devices and systems provide distance measurement by optical-reflection, deflection, defraction or interference patterns. These instruments and systems can be very precise and sensitive if used in a laboratory environment. They are usually very expensive, large in size and not applicable for production or field use. The electromechanical type devices provide measurement by contacting an object with a probe or micrometer type of fixture and the probe motion is transmitted by electrical circuitry (strain gage, potentiometer, Wheatstone bridge, etc.) to an indicator and/or recorder. Specialized mechanical instruments have also been developed for unique inspection or quality control usage.

There are also some fluidic systems for measuring distances which are either extremely complicated or very inefficient. In one system, two nozzles provide a differential pressure which is indicated by deflection of a diaphragm or a manometer. The response of this system is quite slow and is not very accurate. Another fluidic system for measuring distances employs a great number of nozzles and valves and also requires very carefully regulated pressures. This system requires a highly complicated and very expensive arrangement of fluidic devices.

SUMMARY OF THE INVENTION

The purpose of this invention is to provide an accurate measurement of bearing clearances and provide a warning when the clearances exceed predetermined limits. The system provides an extremely accurate clearance indication with a rapid response.

The present invention employs two nozzles which are supplied through identical lines with pressurized fluid. The two nozzles are mounted in close proximity to each other to provide automatic compensation for environmental changes. A simple but accurate fluidic logic system connected to each nozzle processes any differential pressure. The fluid logic system provides an output to indicating devices which give warnings whenever a bearing clearance exceeds predetermined limits. The system also provides an indication when bearing clearances are within normal limits.

OBJECTS OF THE INVENTION

One object of the present invention is to provide a fluidic clearance monitoring system which is extremely accurate.

Another object of the present invention is to provide a fluidic clearance monitoring system which automatically compensates for environmental changes.

Yet another object of the present invention is to provide a fluidic clearance monitoring system which has a rapid response.

Another object of the present invention is to provide a fluidic clearance monitoring system which monitors bearing clearances and automatically gives a warning when bearing clearances are defective.

Other objects, advantages, novel features of the invention will become apparent from the following detailed description of the invention when considered in conjunction with the accompanying drawing.

DETAILED DESCRIPTION OF THE PREFERRED EMBODIMENT

Figure 1:
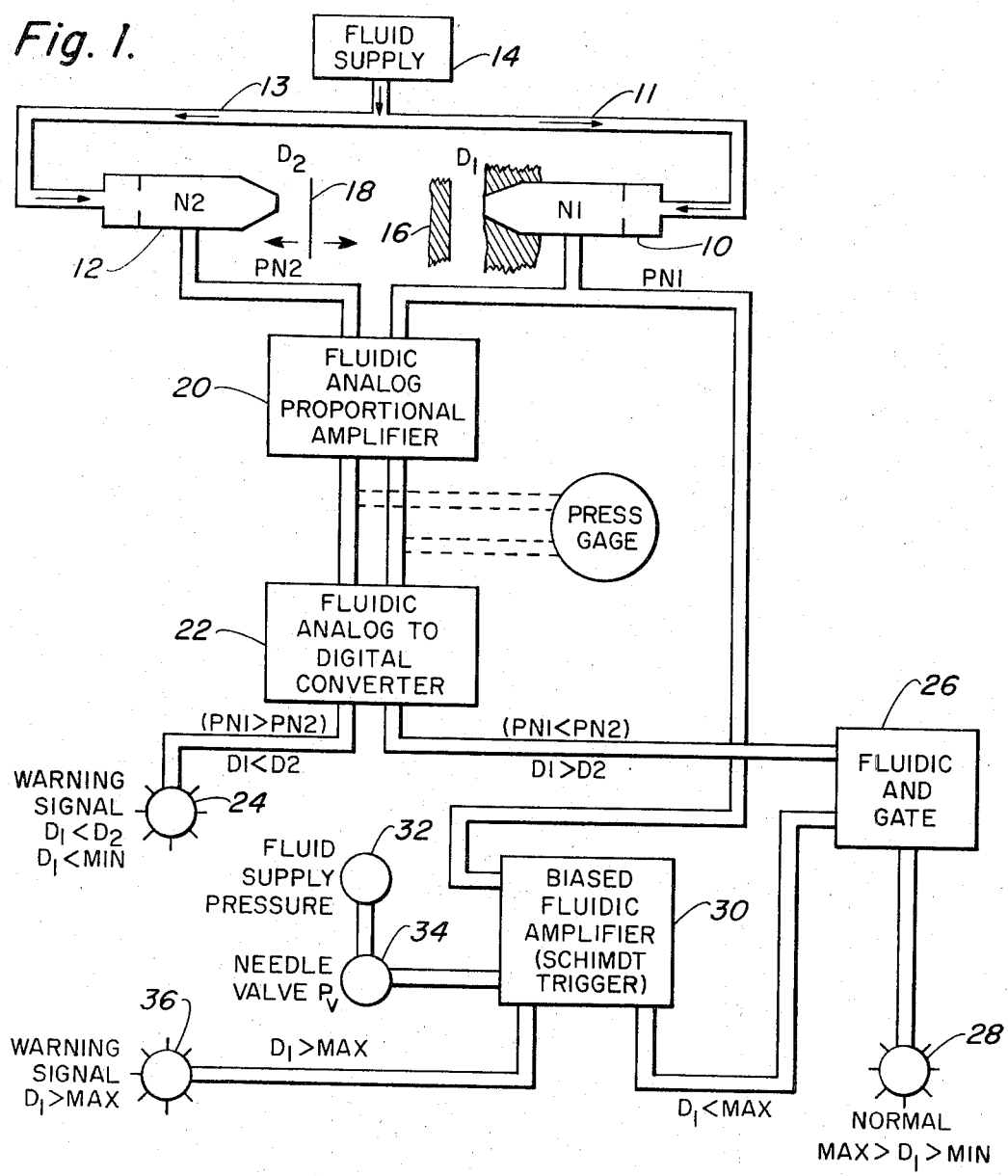
FIG. 1 is a detailed schematic diagram of a fluidic system for monitoring the clearances between bearings.
Figure 2:
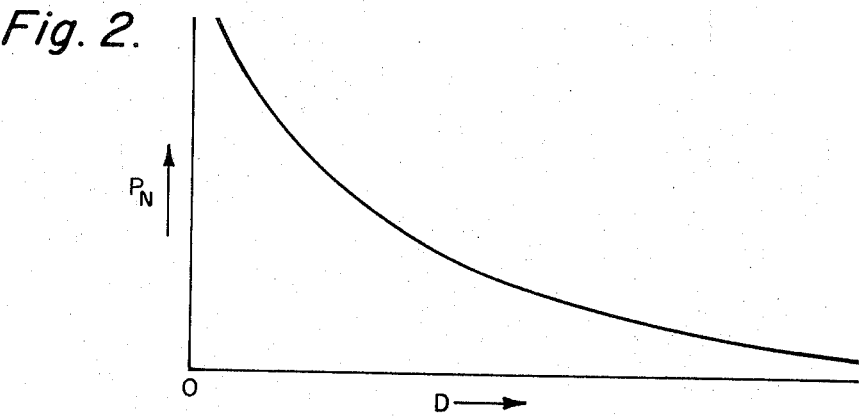
FIG. 2 is a graph illustrating the relationship between nozzle pressure and distance.

Referring to FIG. 1 there is shown a fluidic system having two identical nozzles 10 and 12 connected to a supply of fluid 14 under pressure which may be a gas such as air or any other suitable fluidic material. The first nozzle 10 is mounted either in a bearing housing or adjacent to a bearing generally indicated at 16. The second nozzle 12 is mounted in any convenient place in close proximity to nozzle 10 and has a plate or flapper 18 adjustably mounted in front of the nozzle 12 output. The basic physical principle upon which this fluidic measurement system works is the so called "back pressure" effect. Stated simply, it says that if a nozzle is supplied with fluid under pressure through a choked orifice or restriction, the nozzle pressure will be a function of the distance from the face of the nozzle to a plate or flapper. FIG. 2 is a graph illustrating this principle. As can be seen from the graph, the nozzle pressure $P_N$ is proportional to the distance of the flapper or plate from the nozzle output. Thus, as the distance D increases, the nozzle pressure $P_N$ decreases.

Since the distance D is proportional to the nozzle pressure $P_N$ it can be seen that errors can be readily introduced by variations in the pressure, viscosity, etc., of the supply fluid. Thus, in most systems, the pressure must be very carefully regulated and corrections must be applied for viscosity or temperature changes. In the present system however, this need is avoided by utilizing two identical nozzles 10, 12 supplied through identical lines 11, 13 respectively, with pressurized fluid. Thus, any change in the pressure of the fluid will not result in an error because the differential pressure between the two nozzles 10, 12 will be constant for a given nozzle distance $D_1$. The two nozzle system also provides an additional advantage in that environmental changes are automatically compensated for by keeping the two nozzles 10, 12 in close proximity, thus eliminating any correction for errors due to the influence of the environment.

As indicated above, both nozzles 10 and 12 including connecting lines 11 and 13, are identical and connected to the same pressurized fluid supply 14. They are mounted close together so that they both are in the same environmental conditions. The first nozzle 10 will be mounted on or in a bearing housing and spaced from a bearing surface indicated by 16. The distance between the first nozzle 10 and the bearing surface 16 is indicated as $D_1$. This is the distance being measured or monitored. The second nozzle 12 is adjusted to some known distance from plate 18 which is designated as distance $D_2$. This distance $D_2$ is manually adjusted to the desired minimum distance that is to be measured or monitored.

Both nozzles 10 and 12 are connected to inputs of a fluidic analog proportional amplifier 20 so that the amplifier sees a differential pressure which is proportional to the variation in the distance $D_1$ between the first nozzle 10 and the bearing surface 16, since the distance $D_2$ between the second nozzle 12 and the plate 18 is fixed. Since nozzles 10 and 12, the bearing surface 16, and the plate 18 are subjected to the same environment and the same fluid supply 14, any changes of these parameters will affect both nozzles systems equally. The variation in differential pressure, therefore, for a given distance $D_1$ will be negligible thereby providing automatic compensation.

The output of the fluidic amplifier 20 is an amplification of the input differential pressure $(P_{N1} - P_{N2})$. That is, the fluidic amplifier 20 amplifies any difference in pressure between nozzle 10 and nozzle 12. The differential pressure may be further amplified to any reasonable level, if desired, by the use of cascading amplifier stages so that the amplified pressure can be used for actuating and performing a variety of logic sequences and control. The amplified differential pressure from fluidic amplifier 20 is then fed to a fluidic analog to digital converter 22 to convert for digital measurement. The fluidic analog to digital converter 22 has two outputs, one to indicate the condition when the pressure in nozzle 10 $(P_{N1})$ is greater than the pressure in nozzle 12 $(P_{N2})$. That is, the condition when $D_1$ is less than $D_2$ indicating that the bearing clearance has gone below a predetermined minimum. This output is connected to an indicating device which gives a warning signal when the condition exists. The indicating device for giving a warning can be fluidic, pneumatic, electrical and could supply an audible warning signal. Appropriate electrical/fluidic interface devices are commonly available. Generally, the warning device 24 will be connected to indicated that the bearing clearance has gone below a minimum in order to prevent scoring or severe damage to the bearing surface. For this reason, the invention is especially suitable for measuring bearing clearances because of its rapid response which allows time for taking corrective action. The second output from the fluidic analog to digital converter 22 provides a signal when $D_1$ is greater than $D_2$. That is, the pressure $P_{N1}$ in nozzle 10 is less than or equal to the pressure $P_{N2}$ in the nozzle 12. This signal is fed into one input of AND gate 26, which in turn is connected to an indicating device 28.

The bias pressure of amplifier 30 is usually obtained by bleeding fluid at 32 from the basic fluid supply 14 through needle valve 34 as indicated in FIG. 1. This bias pressure is adjusted to the pressure which exists in nozzle 10 when $D_1$ is at a predetermined maximum. One output of the Schmidt trigger 30 is connected to a warning signal device 36 and the other output is connected to one input of the AND gate 26. If both input signals to the AND gate ($D_1 > D_2$ and $D_1 <$ maximum) are present indicator 28 will be actuated showing that clearance $D_1$ is normal, neither below a minimum or above a maximum. For the condition when the pressure of nozzle 10 $(P_{N1})$ is less than the bias pressure of needle valve 34 the output of Schmidt trigger 30 is fed to warning signal device 36 indicating that distance $D_1$ has exceeded a predetermined maximum.

The system shown in FIG. 1 was tested for use on a large radar antenna to monitor the clearance between the surfaces of a hydrostatic bearing in the radar antenna pedestal. The system was adjusted to signal to operators of the radar when the clearance between the surfaces of the hydrostatic bearing in the pedestal became less than 0.001 inch or greater than 0.005 inch. When the clearance was between these limits the indicating device 28 signalled to the operators of the radar that the clearance was normal. If it is desired to provide a continuous output reading of measured distance $D_1$, a sensitive pressure gage 38 calibrated in terms of this distance can be connected to the output of the fluidic analog proportional amplifier 20. The proportional signal (pressure) output from the fluidic analog to digital converter can also be displayed on a counter (not shown) if desired.

Obviously, many modifications and variations of the present invention are possible in the light of the above teachings. It is therefore to be understood that within the scope of the appended claims the invention may be practiced otherwise than as specifically described.

I claim:

1. A fluidic indicating system for monitoring clearances in a hydrostatic bearing comprising:
   a. a first nozzle mounted in the bearing housing adjacent to the bearing;
   b. a second nozzle mounted in close proximity to said first nozzle so that said first and second nozzles are in the same environment;
   c. a plate mounted adjacent to the output of the second nozzle a predetermined distance;
   d. a pressurized fluid supply connected through identical lines to said first and second nozzle;
   e. a fluidic analog proportional amplifier connected to said first and second nozzles for amplifying any pressure difference between the two nozzles;
   f. a fluidic analog to digital converter connected to the outputs of the fluidic analog proportional amplifier, and having first and second outputs;
   g. a warning device connected to the first output of the analog to digital converter to indicated when the pressure in the first nozzle exceeds the pressure in the second nozzle whereby a warning is given when bearing clearance goes below a predetermined minimum.

2. The fluidic system of claim 1 wherein the plate adjacent to the second nozzle is adjustable.

3. The fluidic system of claim 1 including:
   a. a biased fluidic amplifier connected to the first nozzle and having first and second outputs;
   b. means connecting the biased fluidic amplifier to the fluid supply; said means including a neddle valve for adjusting the fluid supply to a predetermined pressure;
   c. a warning device connected to the first output of the biased fluidic amplifier for indicating when the pressure in the first nozzle is below the pressure set by the needle valve whereby a warning is given when bearing clearance exceeds a predetermined maximum.

4. The fluidic system of claim 3 further including:
   a. a fluidic AND gate connected to the second output of the analog to digital converter and to the second output of the biased fluidic amplifier; and
   b. an indicating device connected to said AND gate for indicating a normal condition when the pressure in the first nozzle is below a predetermined maximum and above a predetermined minimum.

* * * * *